United States Patent
Eda et al.

(10) Patent No.: US 11,861,242 B2
(45) Date of Patent: Jan. 2, 2024

(54) IMAGE FORMING APPARATUS

(71) Applicant: CANON KABUSHIKI KAISHA, Tokyo (JP)

(72) Inventors: Hiroyuki Eda, Ibaraki (JP); Tsuyoshi Shiga, Chiba (JP); Hiromi Shimura, Ibaraki (JP); Rumi Konno, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/873,628

(22) Filed: Jul. 26, 2022

(65) Prior Publication Data

US 2023/0033817 A1     Feb. 2, 2023

(30) Foreign Application Priority Data

Jul. 30, 2021   (JP) .................................. 2021-124888

(51) Int. Cl.
*G06F 3/12*          (2006.01)

(52) U.S. Cl.
CPC .......... *G06F 3/1208* (2013.01); *G06F 3/1237* (2013.01); *G06F 3/1284* (2013.01)

(58) Field of Classification Search
CPC ..... G06F 3/1208; G06F 3/1237; G06F 3/1284
See application file for complete search history.

(56) References Cited

U.S. PATENT DOCUMENTS

| | | | |
|---|---|---|---|
| 2017/0082963 A1 | 3/2017 | Tsue | |
| 2018/0074447 A1* | 3/2018 | Miyamae | G03G 15/80 |
| 2018/0152573 A1* | 5/2018 | Taki | H04N 1/00663 |
| 2018/0157446 A1* | 6/2018 | Fukuda | G06K 15/16 |
| 2020/0051231 A1* | 2/2020 | Tsukamoto | H04N 1/00063 |
| 2020/0210115 A1* | 7/2020 | Igawa | H04N 1/00034 |
| 2021/0067648 A1* | 3/2021 | Yamashita | H04N 1/00724 |

FOREIGN PATENT DOCUMENTS

JP         2017058564 A      3/2017

* cited by examiner

Primary Examiner — John R Wallace
(74) Attorney, Agent, or Firm — ROSSI, KIMMS & McDOWELL LLP (57) ABSTRACT

An image forming apparatus includes a feeding unit, an image forming unit, a reading unit, a conveyance unit, a first discharge unit and a second discharge unit, a determination unit, and a control unit. When an (n)th sheet in a first copy is an abnormal sheet, remaining sheets include sheets fed by the feeding unit after the abnormal sheet is fed by the feeding unit until the image on the abnormal sheet is read by the reading unit, and the remaining sheets include a first group of remaining sheets and a second group of remaining sheets. The control unit is configured to execute an abnormal discharge mode in which the sheets of the first group of the remaining sheets are discharged to the second discharge unit and each of the sheets of the second group of the remaining sheets is discharged selectively to the first or the second discharge unit.

4 Claims, 9 Drawing Sheets

IMAGE FORMING APPARATUS

BACKGROUND OF THE INVENTION

Field of the Invention

The present disclosure relates to an image forming apparatus that forms an image on a sheet.

Description of the Related Art

Conventionally, there has been known an electrophotographic image forming apparatus equipped with an inspection apparatus that reads an image formed on a sheet and compares the image with original image information to determine whether the image on the sheet is good or poor. In such an image forming apparatus, a sheet determined to have an abnormal image formed thereon is discharged to an escape tray as a deficient sheet, and all sheets on which images have already been formed upstream of the sheet determined to have an abnormal image are discharged as waste sheets. Thereafter, by automatically reprinting the sheets after and including the sheet determined to have an abnormal image, it is possible to obtain a high-quality output without requiring the user to perform special work. However, the already image-formed sheets existing upstream of the sheet determined to be abnormal are not necessarily abnormal, and it is not preferable to discharge all the sheets to the escape tray because the number of waste sheets increases.

In order to solve this problem, there has been developed an image forming apparatus including an inspection apparatus in which a second conveyance path is installed in addition to a first conveyance path that is normally used (refer to Japanese Patent Laid-Open No. 2017-058564). In such an image forming apparatus, sheets on which images have already been formed upstream of a sheet determined to have an abnormal image stand by in the second conveyance path. Then, only the sheet determined to have an abnormal image is discharged to the escape tray and reprinted while the normal sheets are standing by, and thereafter, the normal sheets that are standing by are discharged to a normal tray. According to such an image forming apparatus, the sheets on which images have already been formed upstream of the sheet determined to have an abnormal image do not need to be waste sheets, thereby reducing the number of waste sheet.

However, in the image forming apparatus described in Japanese Patent Laid-Open No. 2017-058564, the dedicated second conveyance path for retracting the sheets on which images have already been formed upstream of the sheet determined to have an abnormal image is provided inside the apparatus body. For this reason, the number of components increases as compared with that in a case where the second conveyance path is not provided, which may cause an increase in size and complexity of the apparatus.

SUMMARY OF THE INVENTION

The present disclosure provides an image forming apparatus having a function of discharging a sheet determined to have an abnormal image by an inspection apparatus to an escape tray, and capable of suppressing an increase in size and complexity of the apparatus while reducing the number of waste sheets.

According to a first aspect of the present invention, an image forming apparatus includes a feeding unit configured to feed a sheet, an image forming unit configured to form an image on the sheet fed by the feeding unit, a reading unit configured to read the image formed on the sheet by the image forming unit, a conveyance unit configured to convey the sheet on which the image read by the reading unit, a first discharge unit and a second discharge unit to which the sheet conveyed by the conveyance unit is selectively discharged, a determination unit configured to execute determination processing to determine whether the image read by the reading unit is a normal image or an abnormal image, and a control unit. If the determination unit determines that an image on a sheet is a normal image, the control unit is configured to discharge the sheet on which the normal image is formed to the first discharge unit, and if the determination unit determines that an image on a sheet is an abnormal image, the control unit is configured to discharge the sheet on which the abnormal image is formed to the second discharge unit. In an image forming job in which images for a first copy and a second copy that is a next copy of the first copy are consecutively formed, each copy including a plurality of sheets, in a case where an (n)th sheet in the first copy is an abnormal sheet on which an abnormal image is formed, remaining sheets include sheets fed by the feeding unit after the abnormal sheet is fed by the feeding unit until the image on the abnormal sheet is read by the reading unit, and the remaining sheets include a first group of remaining sheets and a second group of remaining sheets, the first group of the remaining sheets including sheets from an (n+1)th sheet to the last sheet of the first copy and sheets from a 1st sheet to an (n−1)th sheet of the second copy, the second group of the remaining sheets including sheets from the (n)th sheet of the second copy to the last sheet of the remaining sheets, and the control unit is configured to execute an abnormal discharge mode in which the sheets of the first group of the remaining sheets are discharged to the second discharge unit and each of the sheets of the second group of the remaining sheets is discharged selectively to the first discharge unit or the second discharge unit based on a result of the determination processing.

Further features of the present invention will become apparent from the following description of exemplary embodiments with reference to the attached drawings.

DESCRIPTION OF THE EMBODIMENTS

Figure 1:
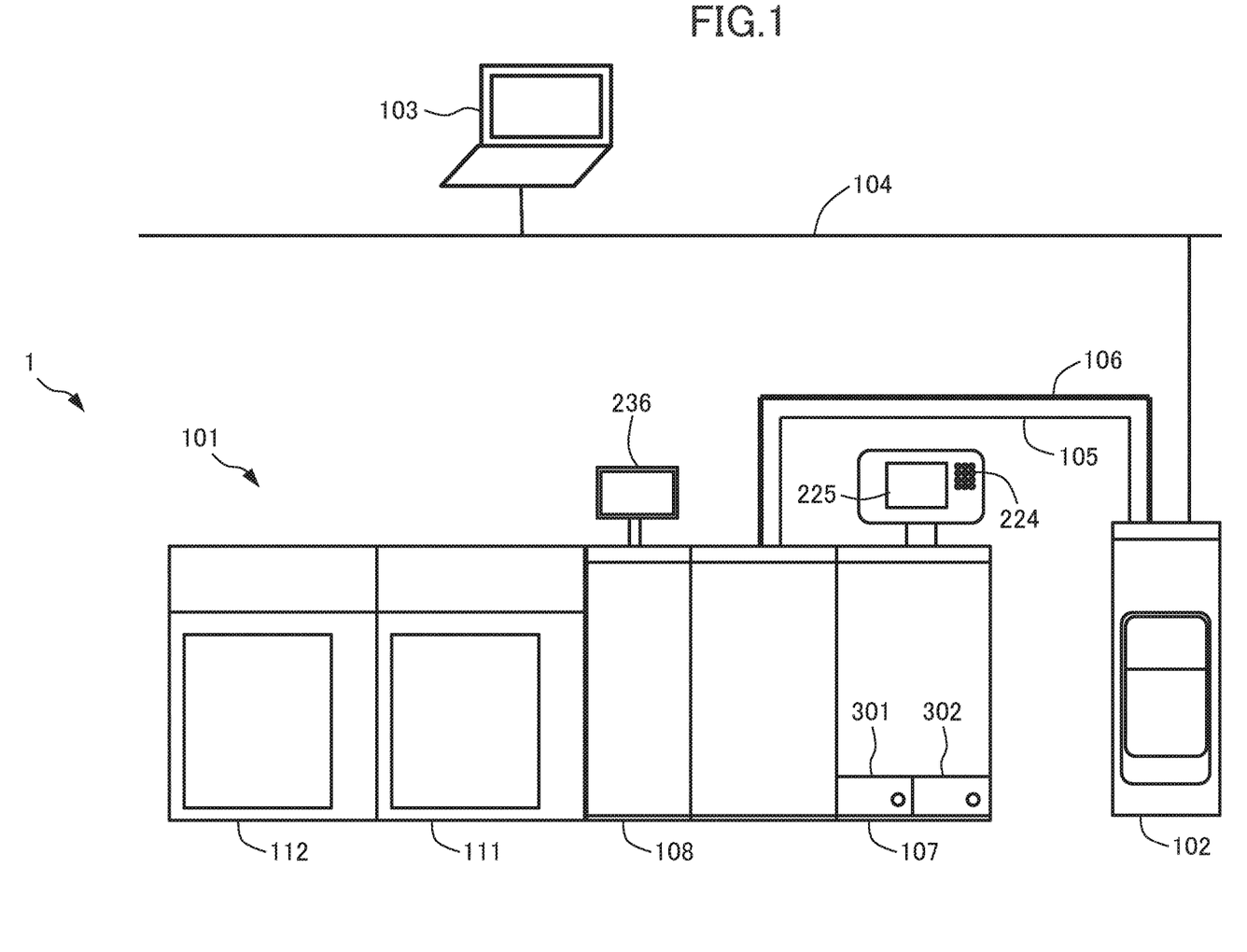
FIG. 1 is a front view showing a schematic configuration of an image forming system according to an embodiment.

Hereinafter, an embodiment of the present disclosure will be described in detail with reference to FIGS. 1 to 7. In the present embodiment, an image forming apparatus 101 when applied to an image forming system 1 will be described.
Schematic Configuration of Image Forming System FIG. 1 is a diagram of an overall hardware configuration of the image forming system 1 according to the present embodiment. The image forming system 1 includes an image forming apparatus 101 and an external controller 102. The image forming apparatus 101 and the external controller 102 are communicably connected to each other via an internal LAN 105 and a video cable 106. The external controller 102 is communicably connected to a client PC 103 via an external LAN 104, and a print instruction is transmitted from the client PC 103 to the external controller 102.

A printer driver having a function of converting print data into a print description language processible by the external controller 102 is installed in the client PC 103. A user who performs printing can transmit a print instruction from various kinds of applications via the printer driver. Based on the print instruction from the user, the printer driver installed in the client PC 103 transmits print data to the external controller 102. Upon receipt of the print instruction from the client PC 103, the external controller 102 executes the print instruction by performing data analysis and rasterization processing, and transmitting print data including image information to the image forming apparatus 101.

A plurality of apparatuses having different functions are connected to the image forming apparatus 101 to enable complicated printing processing such as bookbinding. In the present embodiment, the image forming apparatus 101 includes a printing apparatus 107, an inspection apparatus 108, and a first stacker 111 and a second stacker 112 which are large-capacity stackers. Note that the image forming apparatus 101 may also be referred to as a multi-function machine, a multi-function peripheral, or an MFP. Further, in the present embodiment, a sheet is a recording material on which a toner image is formed, and specific examples thereof include plain paper, a synthetic resin sheet as a substitute for the plain paper, thick paper, a sheet for an overhead projector, and the like.

Figure 2:
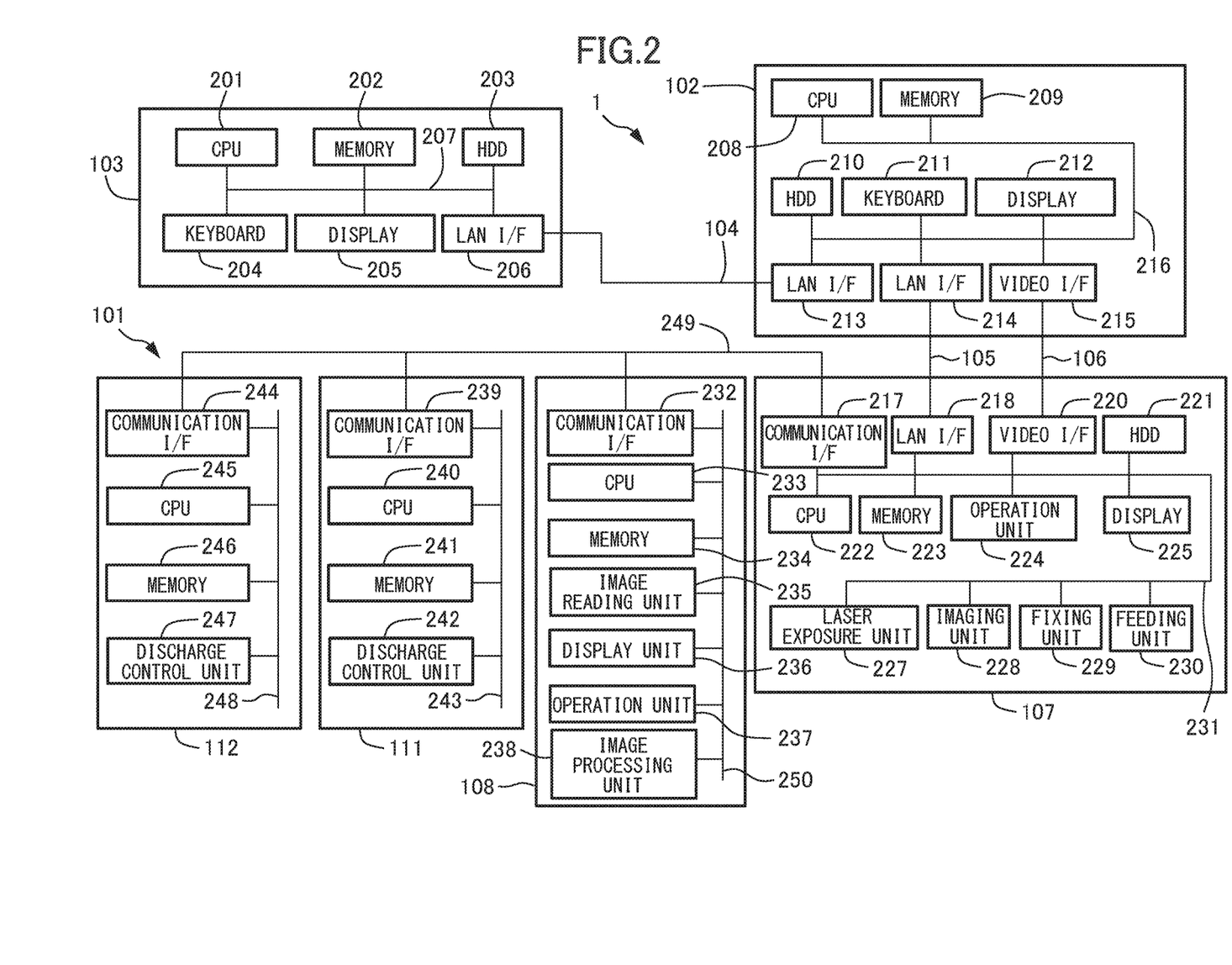
FIG. 2 is a block diagram showing a control system of the image forming system according to an embodiment.

The printing apparatus 107 forms an image using a toner on a sheet conveyed from a feeding cassette 301 or 302 disposed in a lower portion of the printing apparatus 107. That is, the printing apparatus 107 is an example of an image forming unit that forms an image on a sheet based on image information. The inspection apparatus 108 reads the image on the sheet conveyed from the printing apparatus 107 and compares the image with a correct image registered in advance to determine whether or not the printed image is normal. That is, the inspection apparatus 108 is an example of a reading unit that reads an image formed on a sheet by the printing apparatus 107. The first stacker 111 and the second stacker 112 are large-capacity stackers in which large-capacity sheets can be stacked. Note that, although the image forming system 1 described in FIG. 1 has a configuration in which the external controller 102 is connected to the image forming apparatus 101, the present disclosure is not limited to the configuration in which the external controller 102 is connected thereto. That is, the image forming apparatus 101 may be connected to the external LAN 104 to transmit print data that can be processed by the image forming apparatus 101 from the client PC 103. In this case, the image forming apparatus 101 performs data analysis and rasterization processing, and performs printing processing.
Control System of Image Forming System FIG. 2 is a block diagram illustrating a configuration of the system including the image forming apparatus 101, the external controller 102, and the client PC 103.

First, a configuration of the printing apparatus 107 will be described. The printing apparatus 107 includes a communication I/F 217, a LAN I/F 218, a video IF 220, an HDD 221, a CPU 222, a memory 223, an operation unit 224, a display 225, a laser exposure unit 227, an imaging unit 228, a fixing unit 229, and a feeding unit 230. The individual components are connected to each other via a system bus 231. In the present embodiment, a tandem type full-color printer is described as an example of the printing apparatus 107. However, the present disclosure is not limited to the tandem type printing apparatus 107, and the printing apparatus 107 may be another type of image forming apparatus. Also, the present disclosure is not limited to the full-color printing apparatus 107, and the printing apparatus 107 may be a monochrome or mono-color image forming apparatus.

The communication interface (I/F) 217 is connected to the inspection apparatus 108, the first stacker 111, and the second stacker 112 via a communication cable 249 to perform communication for controlling each of those apparatuses. The LAN IF 218 is connected to the external controller 102 via the internal LAN 105 to perform communication for print data and the like. The video I/F 220 is connected to the external controller 102 via the video cable 106 to perform communication for image data and the like. The HDD 221 is a storage device that stores programs and data. Based on the programs and the like stored in the HDD 221, the CPU 222 comprehensively performs image processing control and printing control. The memory 223 operates as a work area in which programs and image data necessary when the CPU 222 performs various kinds of processing are stored. The operation unit 224 receives various setting inputs and operation instructions from the user. The display 225 displays setting information of the image forming apparatus 101, a processing status of a print job, and the like.

The laser exposure unit 227 is a device that performs primary charging and laser exposure for irradiating a photosensitive drum with laser light in order to transfer a toner image. In the laser exposure unit 227, first, the primary charging is performed to charge a surface of the photosensitive drum to have a uniform negative potential. Next, the photosensitive drum is irradiated with laser light by a laser driver while a reflection angle of the laser light is adjusted using a polygon mirror. As a result, a negative charge at an irradiated portion of the photosensitive drum is neutralized, and an electrostatic latent image is formed. The imaging unit 228, which is a device for transferring a toner onto a sheet, includes a developing unit, a transfer unit, a toner supply unit, etc., and transfers the toner on the photosensitive drum onto the sheet. In the developing unit, the toner charged negatively from a developing cylinder is attached to the electrostatic latent image on the surface of the photosensitive drum for visualization. In the transfer unit, primary transfer is performed by applying a positive potential to a primary transfer roller and transferring the toner on the surface of the photosensitive drum to a transfer belt, and secondary transfer is performed by applying a positive potential to a secondary transfer outer roller and transferring the toner on the transfer belt to a sheet. The fixing unit 229, which is a device for melting and bonding the toner on the sheet to the sheet by heat and pressure, includes a heater, a fixing belt, a pressure belt, etc. The feeding unit 230 is a device for feeding a sheet, and its operation of feeding or conveying the sheet is controlled by a roller and various sensors.

Next, a configuration of the inspection apparatus 108 will be described. The inspection apparatus 108 includes a communication I/F 232, a CPU 233 which is an example of a control unit, a memory 234, an image reading unit 235, a display unit 236, an operation unit 237, and an image processing unit 238, and the individual components are connected to each other via a system bus 250. The communication I/F 232 is connected to the printing apparatus 107 via the communication cable 249 to perform communication necessary for control. The memory 234 is a storage device that store control programs. The image reading unit 235 reads an image on a conveyed sheet on the basis of an instruction from the CPU 233. The CPU 233 performs various kinds of control necessary for inspection according to the control programs stored in the memory 234. The CPU 233 compares the image read by the image reading unit 235 with a correct image stored in the memory 234 to determine whether or not the printed image is normal. That is, the CPU 233 is an example of a determination unit configured to execute determination processing to determine whether the image read by image reading unit 235 is a normal image or an abnormal image. The display unit 236 displays an inspection result, a setting screen, etc. The operation unit 237 is operated by a user to receive an instruction to change the setting of the inspection apparatus 108, register a correct image, or the like. The image processing unit 238 sets a gain adjustment value according to the image reading of the image reading unit 235 and the like to reflect the gain adjustment value in an image reading result.

Next, a configuration of the first stacker 111 will be described. The first stacker 111 includes a communication I/F 239, a CPU 240, a memory 241, and a discharge control unit 242, and the individual components are connected to each other via a system bus 243. The communication I/F 239 is connected to the printing apparatus 107 via the communication cable 249 to perform communication necessary for control. The CPU 240 performs various kinds of control necessary for discharging according to control programs stored in the memory 241. The memory 241 is a storage device that store the control programs. Based on an instruction from the CPU 240, the discharge control unit 242 performs control to convey the conveyed sheet to a stack tray 331 (see FIG. 3), which is a first stack tray, or an escape tray 334 (see FIG. 3). Next, a configuration of the second stacker 112 will be described. The second stacker 112 includes a communication IF 244, a CPU 245, a memory 246, and a discharge control unit 247, and the individual components are connected to each other via a system bus 248. Since the configuration of each unit is similar to that in the first stacker 111, the detailed description thereof will not be repeated.

Next, a configuration of the external controller 102 will be described. The external controller 102 may also be referred to as an image processing controller, a digital front end, a print server, a DFE, or the like. The external controller 102 includes a CPU 208, a memory 209, an HDD 210, a keyboard 211, a display 212, a LAN IF 213, a LAN IF 214, and a video IF 215, which are connected to each other via a system bus 216. Based on programs and data stored in the HDD 210, the CPU 208 comprehensively executes processing such as reception of print data from the client PC 103, RIP processing, and transmission of print data to the image forming apparatus 101. The memory 209 acts as a work area in which programs and data necessary when the CPU 208 performs various kinds of processing are stored. The HDD 210 stores programs and data necessary for operations such as printing processing. The keyboard 211 is a device for inputting an instruction to operate the external controller 102. Information on an application executed by the external controller 102 or the like can be displayed on the display 212 by an image signal as a still image or a moving image. The LAN I/F 213 is connected to the client PC 103 via the external LAN 104 to perform communication for a print instruction or the like. The LAN IF 214 is connected to the image forming apparatus 101 via the internal LAN 105 to perform communication for a print instruction or the like. The video IF 215 is connected to the image forming apparatus 101 via the video cable 106 to perform communication for print data or the like.

Next, a configuration of the client PC 103 will be described. The client PC 103 includes a CPU 201, a memory 202, an HDD 203, a keyboard 204, a display 205, and a LAN IF 206, which are connected to each other via a system bus 207. Based on document processing programs and the like stored in the HDD 203, the CPU 201 creates print data and executes a print instruction to comprehensively control each device connected to the system bus. The memory 202 operates as a work area in which programs and data necessary when the CPU 201 performs various kinds of processing are stored. The HDD 203 stores programs and data necessary for operations such as printing processing. The keyboard 204 is a device for inputting an instruction to operate the client PC 103. Information on an application executed by the client PC 103 or the like is displayed on the display 205 by an image signal as a still image or a moving image. The LAN I/F 206 is connected to the external LAN 104 to perform communication for a print instruction or the like.

Although it has been described above that the external controller 102 and the image forming apparatus 101 are connected to each other by the internal LAN 105 and the video cable 106, any configuration may be used as long as data necessary for printing can be transmitted and received therebetween. For example, only the video cable may be used for a connection configuration. In addition, each of the memory 202, the memory 209, the memory 223, the memory 234, the memory 241, and the memory 246 may be any storage device as long as data and programs can be stored therein. For example, each of the memories may be substituted with a volatile RAM, a non-volatile ROM, a built-in HDD, an external HDD, a USB memory, or the like.

Image Forming Apparatus

Figure 3:
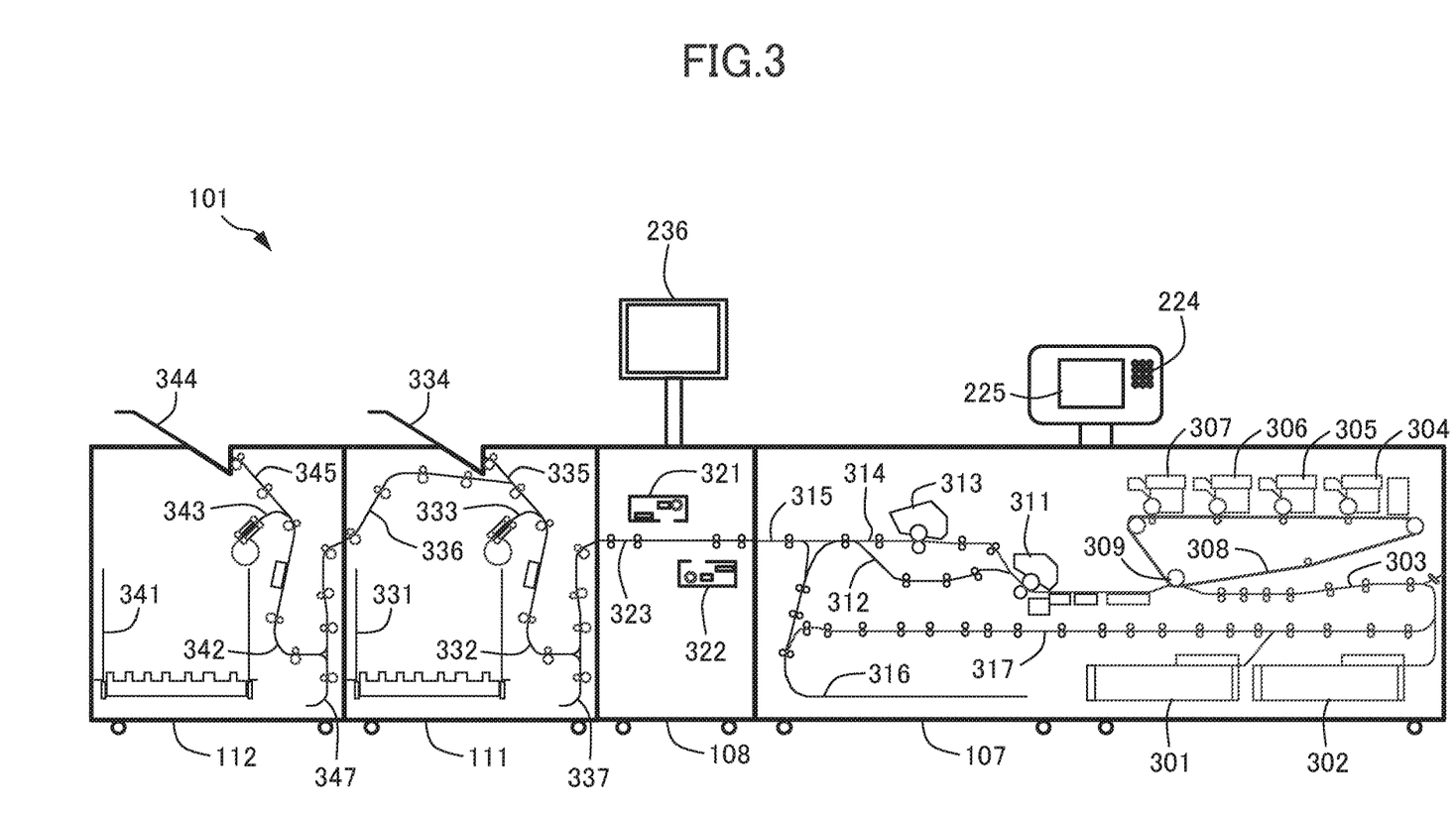
FIG. 3 is a cross-sectional view showing a schematic configuration of an image forming apparatus according to an embodiment.

FIG. 3 is a cross-sectional view of the image forming apparatus 101. The configuration and the operation principle of the printing apparatus 107 are as follows. In the printing apparatus 107, various kinds of sheets can be accommodated in the feeding cassettes 301 and 302. Only the uppermost one of the sheets accommodated in each of the feeding cassettes 301 and 302 can be separated and conveyed to a sheet conveyance path 303. In development stations 304 to 307, toner images are formed using Y, M, C, and K color toners, respectively, to form a color image. In each of the development stations 304 to 307, the photosensitive drum is irradiated with a light beam such as a laser beam modulated according to image data as scanning light after being reflected by a rotating polygon mirror or the like. An electrostatic latent image formed on the photosensitive drum by the laser light is developed by a toner, and a toner image is primarily transferred to an intermediate transfer belt 308. By sequentially executing such a series of image forming processes with respect to yellow (Y), magenta (M), cyan (C), and black (K) toners, a full-color image is formed on the intermediate transfer belt 308. The intermediate transfer belt 308 rotates clockwise in FIG. 3, and the toner image is secondarily transferred to the sheet conveyed from the sheet conveyance path 303 at a secondary transfer position 309 and the sheet with the toner image thereon is conveyed to a first fixing unit 311. The first fixing unit 311 includes a pressing roller and a heating roller to fix the toner image onto the sheet by melting and pressure-bonding the toners when the sheet passes between the rollers. The sheet that having passed through the first fixing unit 311 is conveyed to a sheet conveyance path 315 through a sheet conveyance path 312.

A certain type of sheet may require further melting and pressure-bonding to fix the toner image thereto. In this case, the sheet is conveyed to a second fixing unit 313 by a sheet conveyance path disposed above the first fixing unit 311 after passing through the first fixing unit 311. After additional melting and pressure-bonding are performed in the second fixing unit 313, the sheet is conveyed to a sheet conveyance path 315 through a sheet conveyance path 314. In a case where an image forming mode is a double-side mode, the sheet is conveyed to a sheet reversing path 316. After reversed in the sheet reversing path 316, the sheet is conveyed to a double-side conveyance path 317, and an image is transferred to a back surface of the sheet at the secondary transfer position 309. The display 225 displays a printing status of the image forming apparatus 101 and information for setting.

The sheet having passed through the printing apparatus 107 is conveyed to the inspection apparatus 108. In the inspection apparatus 108, a first CIS unit 321 and a second CIS unit 322 are arranged to face each other. The first CIS unit 321 is a CIS unit for reading an upper side of the sheet, and the second CIS unit 322 is a CIS unit for reading a lower side of the sheet. The inspection apparatus 108 reads the images on the sheet using the first CIS unit 321 and the second CIS unit 322 at a timing when the sheet conveyed to the sheet conveyance path 323 reaches a predetermined position, and determines whether or not the images are normal on the basis of a reading result. The display unit 236 displays a result of the inspection performed by the inspection apparatus 108 and the like. Note that the first CIS unit 321 and the second CIS unit 322 are not limited to CIS units as sensors, and may be constituted by other optical system sensors such as CCDs or CMOSs. The sheet conveyance path 323 is an example of a conveyance unit that conveys a sheet whose images have been read by the inspection apparatus 108.

First Stacker

The first stacker 111 includes a stack tray 331 which is an example of a first discharge unit as a tray on which sheets are stacked, and an escape tray 334 which is an example of a second discharge unit as a sheet discharge tray. The sheet having passed through the inspection apparatus 108 is conveyed to the first stacker 111. The sheets from a sheet conveyance path 332 are stacked on the stack tray 331 via a sheet conveyance path 333. The escape tray 334 is a sheet discharge tray used to discharge a sheet whose image is determined to be abnormal by the inspection apparatus 108. In a case where the sheet is output to the escape tray 334, the sheet is conveyed from the sheet conveyance path 332 to the escape tray 334 via a sheet conveyance path 335. In a case where the sheet is conveyed to a post-processing apparatus at a stage following the first stacker 111, the sheet is conveyed via a sheet conveyance path 336.

A reversing unit 337 is provided to reverse the sheet, and is used in a case where the sheet is stacked on the stack tray 331. That is, in order to stack the sheet on the stack tray 331 so that a direction of the sheet when input and a direction of the sheet when output are the same, the sheet is reversed by the reversing unit 337. In a case where the sheet is conveyed to the escape tray 334 or the following post-processing apparatus, the sheet is discharged as it is without performing a reversing operation in the reversing unit 337.

Second Stacker

The second stacker 112 includes a second stack tray 341 as a tray on which sheets are stacked, and a tray 344. The sheet having passed through the first stacker 111 is conveyed to the second stacker 112. The sheets from a sheet conveyance path 342 are stacked on the second stack tray 341 via a sheet conveyance path 343. In a case where the sheet is output to the tray 344, the sheet is conveyed from the sheet conveyance path 342 to the tray 344 via a sheet conveyance path 345. A reversing unit 347 is provided to reverse the sheet, and is used in a case where the sheet is stacked on the second stack tray 341. That is, in order to stack the sheet on the second stack tray 341 so that a direction of the sheet when input and a direction of the sheet when output are the same, the sheet is reversed by the reversing unit 347. In a case where the sheet is conveyed to the tray 344, the sheet is discharged as it is without performing a reversing operation in the reversing unit 347.

In the present embodiment, the sheet conveyed by the sheet conveyance path 332 of the inspection apparatus 108 is selectively discharged to the stack tray 331 or the escape tray 334. The CPU 233 of the inspection apparatus 108 executes determination processing for determining whether the image read by the inspection apparatus 108 is a normal image or an abnormal image by comparing the image with image information. In addition, based on a result of the determination processing, the CPU 233 selects either the stack tray 331 or the escape tray 334 as a discharge place to which the sheet is discharged.

Inspection System

The sheet whose image is determined to be abnormal by the inspection apparatus 108 is discharged to the escape tray 334 and needs to be subjected to recovery printing. At the time when it is determined that the image is abnormal, images have already been formed on several sheets (referred to as remaining sheets) by the printing apparatus 107 upstream of the inspection apparatus 108.

That is, the remaining sheets refer to a plurality of sheets on which image formation is started later than the abnormal sheet at the time when the abnormal image is read. In other words, the remaining sheets include sheets fed by the feeding unit 230 after the abnormal sheet is fed by the feeding unit 230 until the image on the abnormal sheet is read by the inspection apparatus 108. However, if all the remaining sheets are discharged to the escape tray 334 and then recovery printing is performed with respect to all the remaining sheets starting from the sheet determined to be abnormal in order to guarantee the order in which the sheets are stacked, productivity is lowered, and all the remaining sheets become waste sheets.

Therefore, in the present embodiment, in an image forming job of forming images for a plurality of copies, sheets from a sheet determined to be abnormal to a sheet immediately before the same page number of sheet in a next copy as that of the sheet determined to be abnormal, among sheets on which image formation has already been completed, are discharged to the escape tray 334. Then, sheets after and including the same page number of sheet in the next copy as that of the sheet determined to be abnormal are inspected by the inspection apparatus 108. If each of the sheets is a normal sheet, the sheet is discharged to the stack tray 331. As a result, the number of waste sheets can be reduced without deteriorating productivity.

Hereinafter, a processing procedure related to inspection processing in each unit of the image forming system 1 will be described in detail with reference to flowcharts of FIGS. 4 to 6.

Processing of Printing Apparatus

Figure 4:
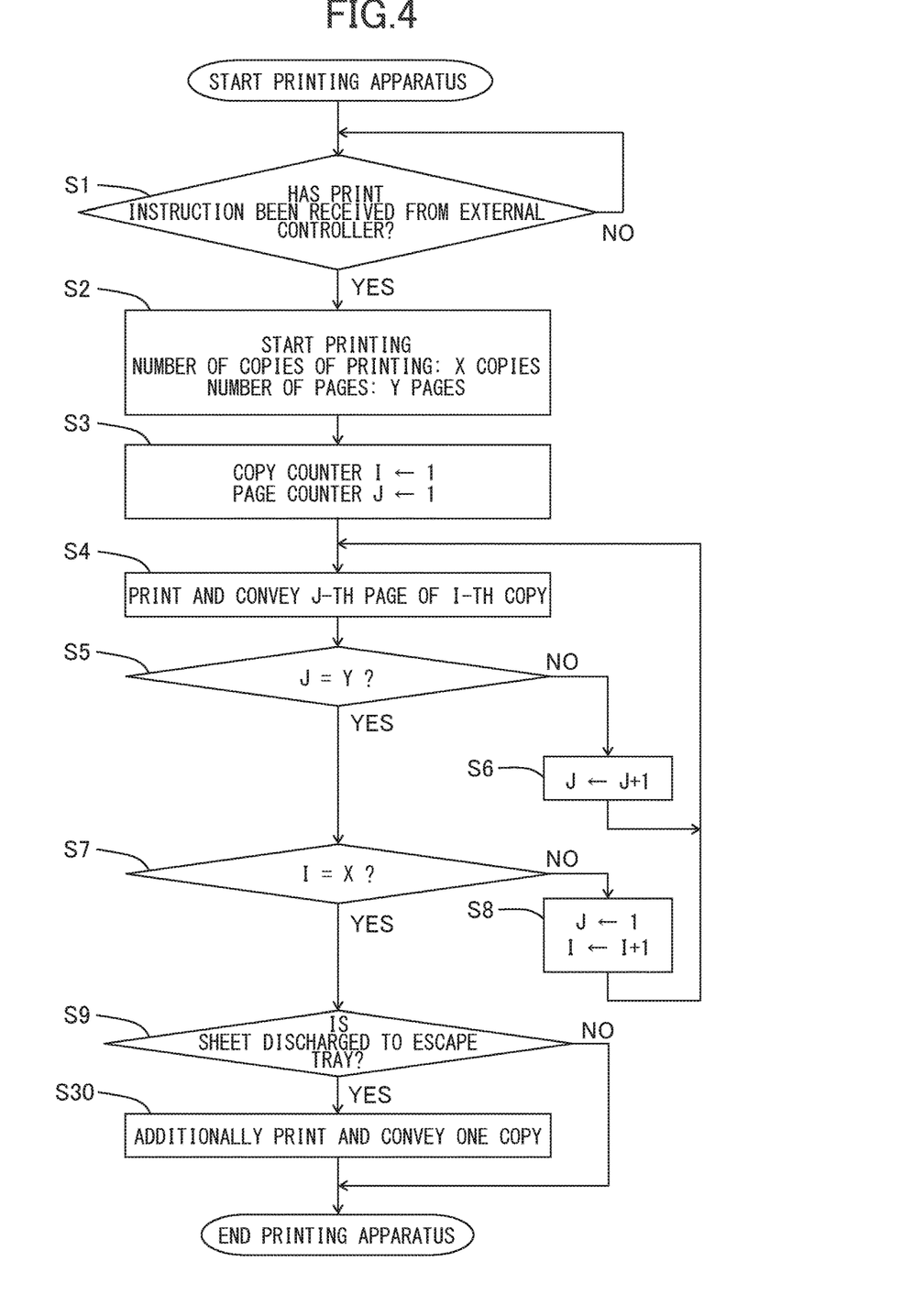
FIG. 4 is a flowchart showing a processing procedure in a printing apparatus according to an embodiment.

FIG. 4 is a flowchart showing a flow of processing performed by the printing apparatus 107 before inspection processing is performed. The processing of FIG. 4 is executed by the CPU 222 of the printing apparatus 107. First, the CPU 222 determines whether or not a print instruction (an image forming job) has been received from the external controller 102 (step S1). If it is determined that no print instruction has been received from the external controller 102 (NO in step S1), the CPU 222 determines again whether or not a print instruction has been received from the external controller 102 (step S1).

If the CPU 222 determines that that a print instruction has been received from the external controller 102 (YES in step S1), the printing apparatus 107 starts printing according to the received image forming job (step S2). Here, the image forming job to be executed will be described, assuming that the number of copies of printing is set to X copies and the number of pages of each copy is set to Y pages. X and Y may be singular or plural. Note that the image forming job refers to image forming instruction details received from a user, which are a series of operations performed on the basis of a print instruction signal (an image forming instruction signal) as follows. That is, the image forming job refers to a period from pre-rotation (preparation operations before image formation) to post-rotation (operations after image formation) after receiving a print command signal (the input of the image formation job), and includes an image formation period and a time interval between sheets (the time when image formation is not performed).

The CPU 222 substitutes 1 into each of a copy counter I and a page counter J as an initial value (step S3), and prints a J-th page of an I-th copy, and conveys the printed sheet to the inspection apparatus 108 (step S4). In order to confirm that the printing of all pages in an I-th copy has been completed, the CPU 222 determines whether or not the page counter J is Y (step S5). If it is determined that the page counter J is not Y (NO in step S5), this indicates that the printing of all pages in the I-th copy has not been completed. In this case, the CPU 222 increments the page counter J by one (step S6) and prints a next page (step S4).

If it is determined that the page counter J is Y (YES in step S5), this indicates that the printing of all pages in the I-th copy has been completed. Next, the CPU 222 determines whether or not the copy counter I is X in order to confirm that printing of all copies has been completed (step S7). If it is determined that the copy counter I is not X (NO in step S7), this indicates that the printing of all copies has not been completed. In this case, the CPU 222 increments the copy counter I by one and substitutes 1 into the page counter J (step S8), and prints a next page (step S4).

If it is determined that the copy counter I is X (YES in step S7), the CPU 222 determines whether or not there is a sheet discharged to the escape tray 334 in the image forming job that is being executed (step S9). This is determined by the CPU 222, for example, based on whether or not the CPU 233 of the inspection apparatus 108 has set a sheet discharge place to the escape tray 334. If the CPU 222 determines that there is a sheet discharged to the escape tray 334 in the image forming job that is being executed (YES in step S9), this indicates that one copy is insufficient as compared with the number of copies of printing set to X copies in the image forming job, as will be described later. Therefore, the CPU 222 additionally prints one copy and conveys the additionally printed copy to the inspection apparatus 108 (step S30). Then, the printing of all copies has been completed, and thus, the processing of the printing apparatus 107 is terminated. If the CPU 222 determines that there is no sheet discharged to the escape tray 334 in the image forming job that is being executed (NO in step S9), this indicates that the printing of all copies has been completed. Thus, the processing of the printing apparatus 107 is terminated.

Processing of Inspection Apparatus

Figure 5:
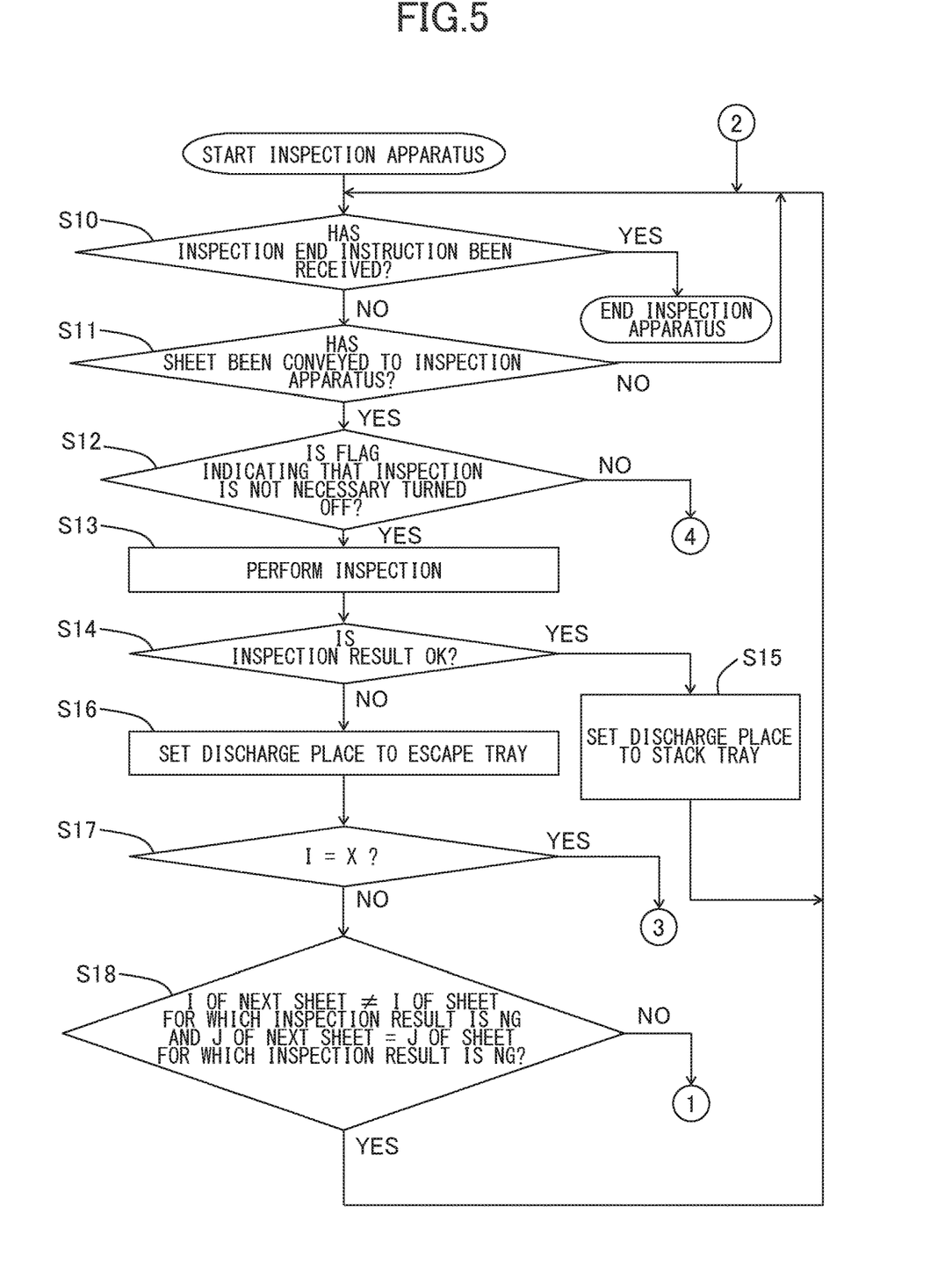
FIG. 5 is a flowchart showing a first half of a processing procedure in an inspection apparatus according to an embodiment.
Figure 6:
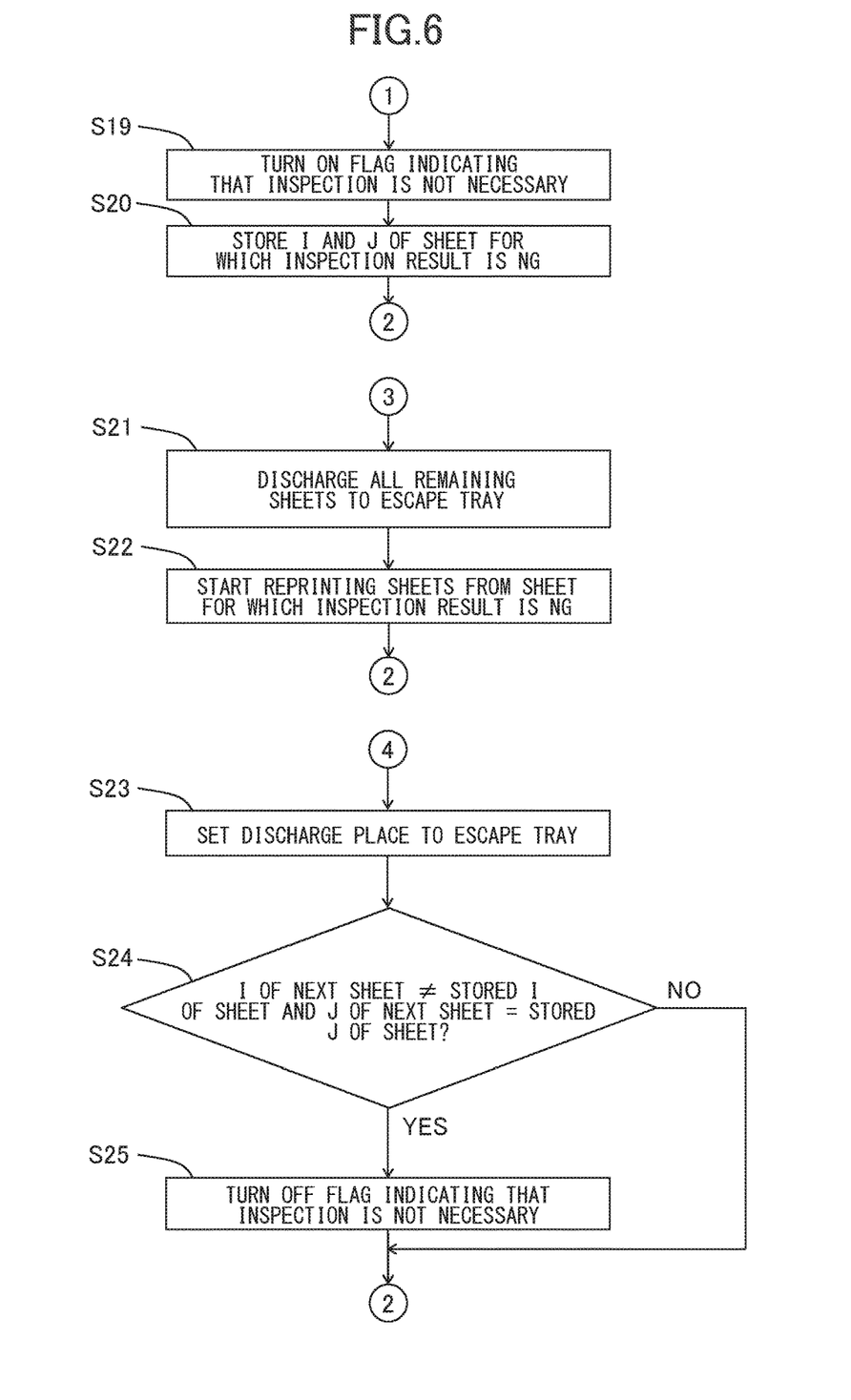
FIG. 6 is a flowchart showing a second half of the processing procedure in the inspection apparatus according to an embodiment.

FIGS. 5 and 6 are flowcharts illustrating a flow of inspection processing performed by the inspection apparatus 108. The processing of FIGS. 5 and 6 is executed by the CPU 233 of the inspection apparatus 108. The CPU 233 determines whether or not an inspection end instruction has been received from the printing apparatus 107 (step S10). If it is determined that an inspection end instruction has been received from the printing apparatus 107 (YES in step S10), the CPU 233 ends the processing of the inspection apparatus 108. If it is determined that no inspection end instruction has been received from the printing apparatus 107 (NO in step S10), the CPU 233 determines whether or not a sheet has been conveyed to the inspection apparatus 108 (step S11). If it is determined that no sheet has been conveyed to the inspection apparatus 108 (NO in step S11), the CPU 233 determines again whether or not an inspection end instruction has been received (step S10).

If it is determined that a sheet has been conveyed to the inspection apparatus 108 (YES in step S11), the CPU 233 determines whether or not a flag indicating that inspection is not necessary, which is stored in the memory 234, is turned off (step S12). If it is determined that the flag indicating that inspection is not necessary, which is stored in the memory 234, is turned off (YES in step S12), the CPU 233 performs inspection processing (determination processing) (step S13). The CPU 233 compares an image read from the conveyed sheet with the correct image, and determines whether the read image is a normal image or an abnormal image, that is, whether or not an inspection result is OK (step S14).

If it is determined that the inspection result is OK (YES in step S14), the CPU 233 sets a place for discharging the sheet on which the normal image is formed to the stack tray 331 (step S15), and determines again whether or not an inspection end instruction has been received (step S10). Note that the discharge place set here is notified to the first stacker 111 via the printing apparatus 107, and the sheet is discharged to the stack tray 331.

If it is determined that the inspection result is not OK (NO in step S14), the CPU 233 sets a place for discharging the sheet on which the abnormal image is formed to the escape tray 334 (step S16). The discharge place set here is notified to the first stacker 111 via the printing apparatus 107, and the sheet is discharged to the escape tray 334. In order to confirm that the copy including the inspected sheet is a last copy of the image forming job, the CPU 233 determines whether or not the copy counter I is X (step S17). If the CPU 233 determines that the copy counter I is not X (NO in step S17), which indicates that the copy including the inspected sheet is not a last copy of the image forming job, the processing proceeds to step S18.

In order to determine whether or not a next sheet includes the same page image as the sheet for which the inspection result is NG (No Good in the specification and Figs.), the CPU 233 compares a copy counter I and a page counter J of the next sheet with the copy counter I and the page counter J of the sheet for which the inspection result is NG, respectively. Specifically, the CPU 233 determines whether or not the copy counter I of the next sheet≠the copy counter I of the sheet for which the inspection result is NG and the page counter J of the next sheet=the page counter J of the sheet for which the inspection result is NG (step S18). Here, in a case where the copy counter I of the next sheet≠the copy counter I of the sheet for which the inspection result is NG and the page counter J of the next sheet=the page counter J of the sheet for which the inspection result is NG, this indicates that an image on the next sheet is the same as the normal image of the sheet for which the inspection result is NG, that is, one copy includes only one sheet. Therefore, if it is determined that the copy counter I of the next sheet≠the copy counter I of the sheet for which the inspection result is NG and the page counter J of the next sheet=the page counter J of the sheet for which the inspection result is NG (YES in step S18), the CPU 233 determines again whether or not an inspection end instruction has been received (step S10).

On the other hand, in step S18, if the copy counter I of the next sheet=the copy counter I of the sheet for which the inspection result is NG or the page counter J of the next sheet≠the page counter J of the sheet for which the inspection result is NG, an image on the next sheet is different from the normal image of the sheet for which the inspection result is NG. Therefore, if it is not determined that the copy counter I of the next sheet≠the copy counter I of the sheet for which the inspection result is NG and the page counter J of the next sheet=the page counter J of the sheet for which the inspection result is NG (NO in step S18), the CPU 233 turns on the flag indicating that inspection is not necessary, which is stored in the memory 234 (step S19). This results in NO in step S12, and accordingly, no determination processing is performed in step S13. The copy counter I and the page counter J of the sheet for which the inspection result is NG are stored in the memory 234 (step S20), and the CPU 233 determines again whether or not an inspection end instruction has been received (step S10).

In addition, if the CPU 233 determines that the copy counter I is X in step S17 (YES in step S17), the copy including the sheet on which the abnormal image is formed is a last copy of the image forming job. Therefore, the CPU 233 discharges all the remaining sheets to the escape tray 334 (step S21), and starts reprinting the sheets from the inspection NG sheet on which the abnormal image is formed (step S22). Thereafter, the CPU 233 determines again whether or not an inspection end instruction has been received (step S10).

In addition, if it is determined in step S12 that the flag indicating that inspection is not necessary, which is stored in the memory 234, is not turned off (NO in step S12), the CPU 233 sets a sheet discharge place to the escape tray 334 (step S23). The discharge place set herein is notified to the first stacker 111 via the printing apparatus 107, and the sheet is discharged to the escape tray 334.

In order to determine whether or not a next sheet includes the same page image as the sheet for which the inspection result is NG, the CPU 233 compares a copy counter I and a page counter J of the next sheet with the copy counter I and the page counter J of the sheet for which the inspection result is NG, respectively. Specifically, the CPU 233 determines whether or not the copy counter I of the next sheet≠the copy counter I of the sheet for which the inspection result is NG and the page counter J of the next sheet=the page counter J of the sheet for which the inspection result is NG (step S24). Note that the determination in step S24 is similar to that in step S18. Here, in a case where the copy counter I of the next sheet≠the copy counter I of the sheet for which the inspection result is NG and the page counter J of the next sheet=the page counter J of the sheet for which the inspection result is NG, this indicates that an image on the next sheet is the same as the normal image of the sheet for which the inspection result is NG. Therefore, if it is determined that the copy counter I of the next sheet≠the copy counter I of the sheet for which the inspection result is NG and the page counter J of the next sheet=the page counter J of the sheet for which the inspection result is NG (YES in step S24), the CPU 233 turns off the flag indicating that inspection is not necessary (step S25). As a result, the determination processing is restarted for a sheet after the sheet discharged to the escape tray 334 in response to the occurrence of the abnormal sheet among the remaining sheets, and a discharge place can be selected based on a result of the determination processing. Thereafter, the CPU 233 determines again whether or not an inspection end instruction has been received (step S10).

In addition, in step S24, if the copy counter I of the next sheet=the copy counter I of the sheet for which the inspection result is NG or the page counter J of the next sheet≠the page counter J of the sheet for which the inspection result is NG, an image on the next sheet is different from the normal image of the sheet for which the inspection result is NG. Therefore, if it is not determined that the copy counter I of the next sheet≠the copy counter I of the sheet for which the inspection result is NG and the page counter J of the next sheet=the page counter J of the sheet for which the inspection result is NG (NO in step S24), the CPU 233 determines again whether or not an inspection end instruction has been received (step S10).

First Embodiment

Figure 7:
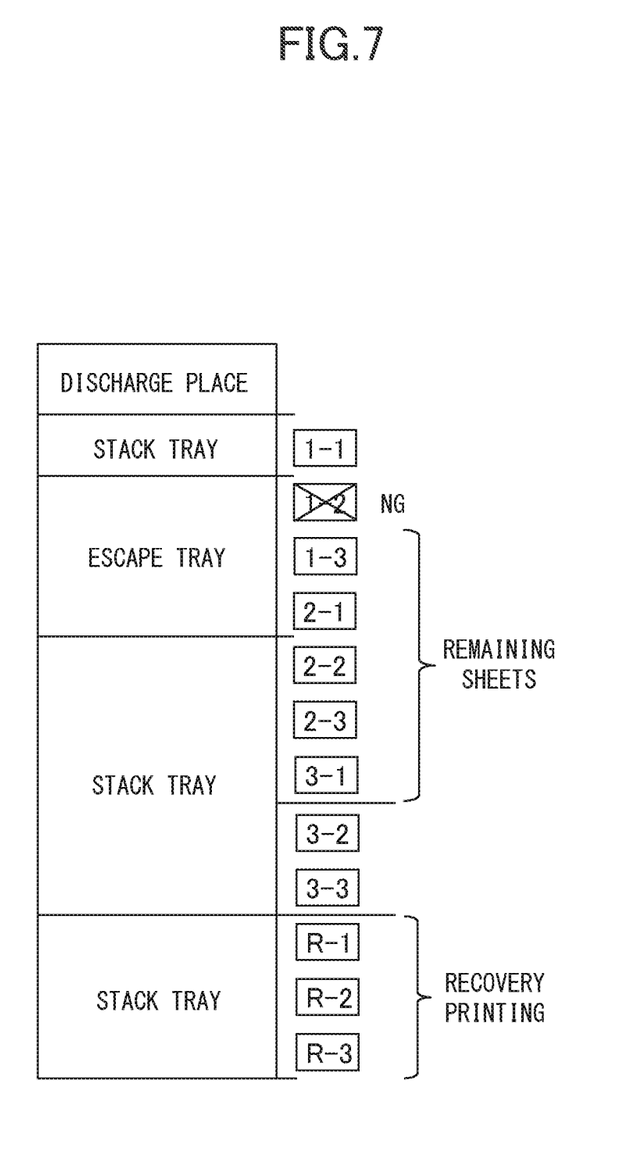
FIG. 7 is an explanatory diagram showing a change in discharge place in a method for controlling an image forming apparatus according to a first embodiment.

A specific first embodiment using the above-described image forming apparatus 101 will be described with reference to FIG. 7. Here, it is assumed that an image forming job is executed in which images are formed consecutively for a plurality of copies (e.g., three copies) as set, each copy including a plurality of sheets (e.g., three sheets). First, the CPU 233 compares an image read by the inspection apparatus 108 with image information to determine whether the image is a normal image or an abnormal image (determination step). If the image read by the inspection apparatus 108 is a normal image, a sheet 1-1 on which the normal image is formed is discharged to the stack tray 331 (first normal discharge step). If the image read by the inspection apparatus 108 is an abnormal image, an abnormal sheet 1-2 on which the abnormal image is formed is discharged to the escape tray 334 (first abnormal discharge process).

A plurality of sheets on which image formation is started later than the abnormal sheet 1-2 at the time when an abnormal image is read are defined as remaining sheets 1-3 to 3-1. Here, the remaining sheets includes a first group and a second group. The first group includes sheets from an (n+1)th sheet to the last sheet of the first copy and sheets from a 1st sheet to an (n−1)th sheet of the second copy. The second group includes sheets from the (n)th sheet of the second copy to the last sheet of the remaining sheets.

Specifically, among the remaining sheets 1-3 to 3-1, first, a sheet 1-3 constituting a first copy of sheets 1-1 to 1-3 including the abnormal sheet 1-2 is discharged to the escape tray 334. Then, among the remaining sheets, a 1st sheet 2-1 to a sheet that is one sheet before the same page number of sheet as that of the abnormal sheet 1-2 of the first copy in a second copy of sheets 2-1 to 2-3 subsequent to the first copy, that is, a sheet 2-1, is discharged to the escape tray 334 (second abnormal discharge process). These sheets 1-3 to 2-1 are sheets of the first group of the remaining sheets. For each of the sheets 2-2 to 3-3 after and including the sheet 2-2 whose page number in the second copy of sheets 2-1 to 2-3 is the same as that of the abnormal sheet 1-2 in the first copy, an image read by the inspection apparatus 108 is compared with the image information to determine whether the image is a normal image or an abnormal image. These sheets 2-2 to 3-1 are sheets of the second group of the remaining sheets. Then, a discharge place is selected based on a result of the determination processing (first selection step). That is, the CPU 233 is configured to execute an abnormal discharge mode in which the sheets of the first group of the remaining sheets are discharged to the escape tray 334 and each of the sheets of the second group of the remaining sheets is discharged selectively to the stack tray 331 or the escape tray 334 based on a result of the determination processing. Note that it is illustrated in FIG. 7 that the sheets 2-2 to 3-3 are normal sheets, and the sheets 2-2 to 3-3 are discharged to the stack tray 331.

Then, image formation is performed by the printing apparatus 107 until the number of copies discharged to the stack tray 331 reaches a set number of copies which is the number of copies to be printed in the image forming job (recovery printing, R-1 to R-3), and the copies are discharged to the stack tray 331 (second normal discharge process). That is, the recovery printing is performed with respect to the same number of copies as the number of abnormal sheets generated in the job. As described above, the method for controlling the image forming apparatus 101 according to the first embodiment includes the determination step, the first normal discharge step, the first abnormal discharge step, the second abnormal discharge step, the first selection step, and the second normal discharge step. Note that the second normal discharge step may be executed according to a user's instruction after issuing a warning to the user that an abnormal image has occurred, rather than being automatically executed.

As described above, in the image forming apparatus 101 according to the present embodiment, in an image forming job in which images are formed consecutively for a first copy and a second copy that is a next copy of the first copy, each copy including a plurality of sheets, in a case where an nth sheet in the first copy is an abnormal sheet, sheets after and including an (n+1)th sheet in the first copy and sheets from a 1st sheet to an (n−1)th sheet in the second copy, among a plurality of remaining sheets, are discharged to the escape tray 334. Then, for each of the sheets after and including an nth page number of sheet in the second copy among the remaining sheets, a discharge place is determined based on a result of determination processing by the inspection apparatus 108. In the present embodiment, the inspection apparatus 108 does not perform determination processing on the sheets after and including the (n+1)th sheet in the first copy and sheets from the 1st sheet to the (n−1)th sheet in the second copy among the plurality of remaining sheets. That is, in the abnormal discharge mode, the CPU 233 is configured not to execute the determination processing on the sheets of the first group of the remaining sheets. How-ever, the CPU 233 may execute the inspection apparatus 108 to perform determination processing on these sheets. In such a case, the CPU 233 can specify whether or not each of the plurality of sheets discharged to the escape tray 334 is a normal sheet, and notify the user of the same.

Second Embodiment

Figure 8:
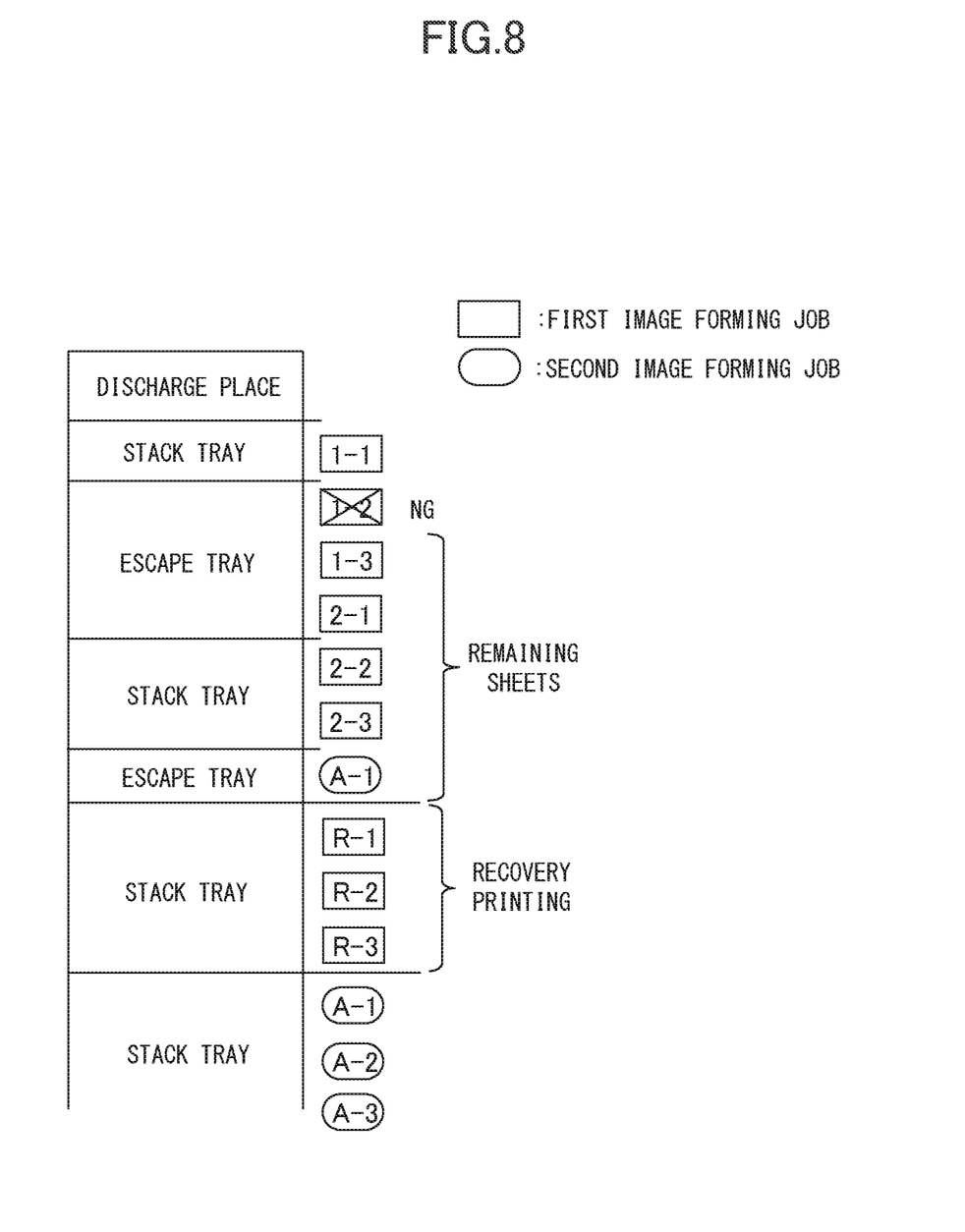
FIG. 8 is an explanatory diagram showing a change in discharge place in a method for controlling an image forming apparatus according to a second embodiment.

Next, a specific second embodiment using the above-described image forming apparatus 101 will be described with reference to FIG. 8. Here, it is assumed that a first image forming job is executed in which images are formed consecutively for a plurality of copies (e.g., two copies) as set, each copy including a plurality of sheets (e.g., three sheets). Also, it is assumed that, after the first image forming job is terminated, a second image forming job is consecutively executed in which images are formed consecutively, for example, for two copies, each copy including, for example, three sheets. The second image forming job differs from the first image forming job in images to be formed. Here, it is assumed that the second image forming job is consecutively executed after the first image forming job is terminated, with remaining sheets including a sheet on which an image is formed in the second image forming job. In addition, it is assumed that an abnormal sheet is not a sheet included in a last copy of the first image forming job. In this case, similarly to the first embodiment, the CPU 233 executes the determination step, the first normal discharge step, the first abnormal discharge step, the second abnormal discharge step, and the first selection step.

In addition, the CPU 233 discharges, to the stack tray 331, sheets 2-2 to 2-3 from the same page number of sheet 2-2 in the second copy as that of the abnormal sheet in the first copy to a last sheet 2-3 in a last copy of the first image forming job. The CPU 233 discharges a sheet A-1 on which an image is formed in the second image forming job among the remaining sheets to the escape tray 334 (third abnormal discharge step). In the abnormal discharge mode, in a case where the second image forming job in which an image formed by the printing apparatus 107 is different from the image in the first image forming job is consecutively executed after the first image forming job is terminated, and the second group (2-2 to A-1) of the remaining sheets includes a sheet (A-1) on which the image is formed in the second image forming job, the CPU 233 is configured to discharge the sheet (A-1) on which the image is formed in the second image forming job in the second group of the remaining sheets to the escape tray 334.

Then, image formation is performed by the printing apparatus 107 until the number of copies of sheets discharged to the stack tray 331 reaches a set number of copies (recovery printing, R-1 to R-3), and all of the set number of copies of sheets are discharged to the stack tray 331 (second normal discharge process). As described above, the method for controlling the image forming apparatus 101 according to the second embodiment includes the determination step, the first normal discharge step, the first abnormal discharge step, the second abnormal discharge step, the first selection step, the third abnormal discharge step, and the second normal discharge step. Note that the second image forming job is executed after the image formation in the second normal discharge step is terminated.

Third Embodiment

Figure 9:
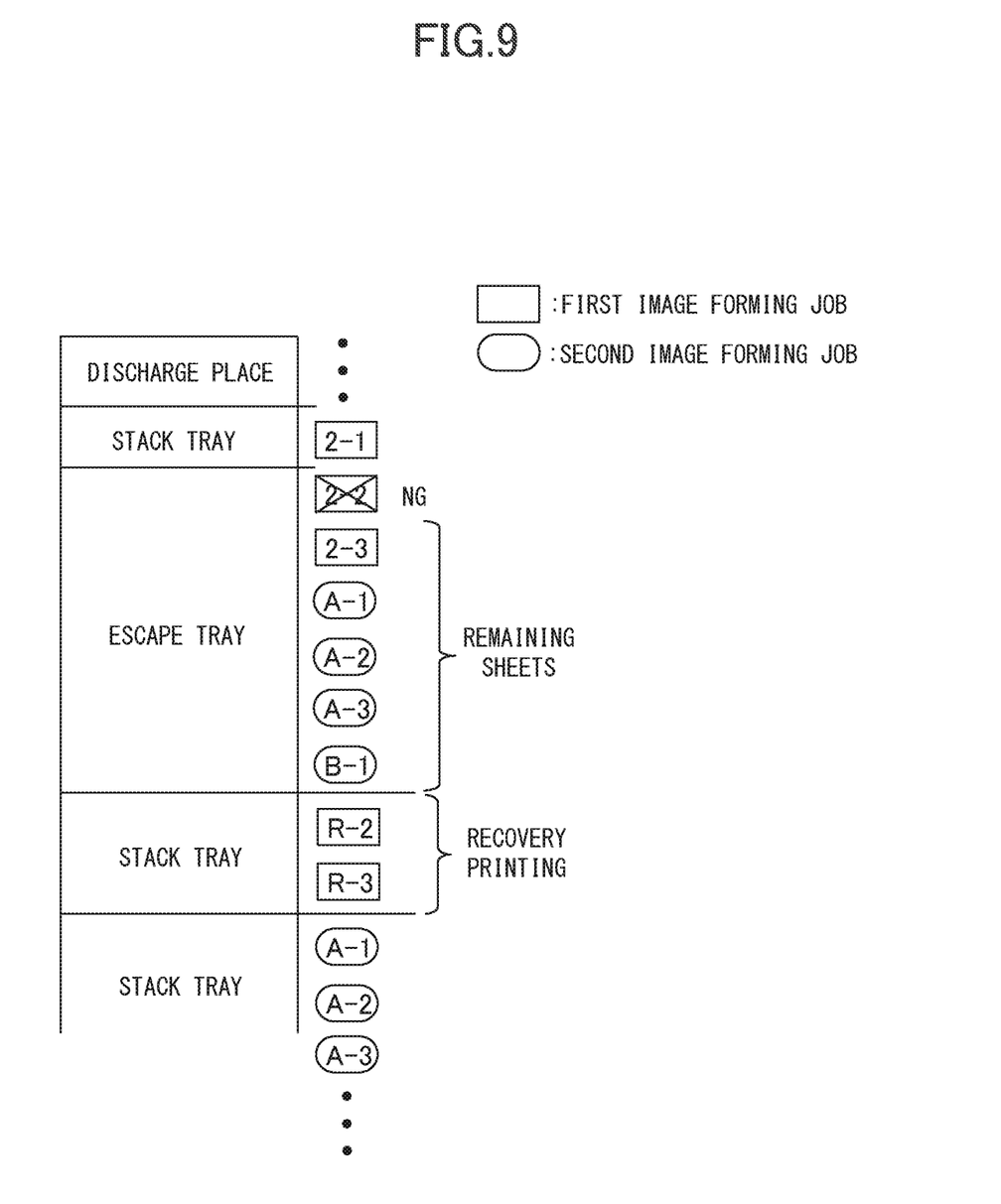
FIG. 9 is an explanatory diagram showing a change in discharge place in a method for controlling an image forming apparatus according to a third embodiment.

Next, a specific third embodiment using the above-described image forming apparatus 101 will be described with reference to FIG. 9. Here, it is assumed that a first image forming job is executed in which images are formed consecutively for a plurality of copies (e.g., two copies) as set, each copy including a plurality of sheets (e.g., three sheets). Also, it is assumed that, after the first image forming job is terminated, a second image forming job is consecutively executed in which images are formed consecutively, for example, for two copies, each copy including, for example, three sheets. The second image forming job differs from the first image forming job in images to be formed. Here, it is assumed that the second image forming job is consecutively executed after the first image forming job is terminated, with remaining sheets including a sheet on which an image is formed in the second image forming job. In addition, it is assumed that an abnormal sheet 2-2 is a sheet included in a last copy of the first image forming job. That is, a sheet A-1 on which an image is formed in the second image forming job immediately follows sheets 2-1 to 2-3 of the last copy of the first image forming job. In this case, similarly to the first embodiment, the CPU 233 executes the determination step, the first normal discharge step, and the first abnormal discharge step.

The CPU 233 discharges all the remaining sheets 2-3 to B-1 to the escape tray 334 (fourth abnormal discharge step). That is, in the abnormal discharge mode, in a case where the second image forming job in which an image formed by the image forming unit is different from the image in the first image forming job is consecutively executed after the first image forming job is terminated, and the first copy is the last copy of the first image forming job, the CPU 233 is configured to discharge all the remaining sheets to the escape tray 334. Then, image formation is performed by the printing apparatus 107 for the sheets 2-2 to 2-3 after and including the same page number of sheet as that of the abnormal sheet (recovery printing, R-2 to R-3). At this time, for each of the sheets 2-2 to 2-3 after and including the same page number of sheet as that of the abnormal sheet, an image read by the inspection apparatus 108 is compared with the image information to determine whether the image is a normal image or an abnormal image, and a discharge place is selected based on a result of the determination processing (second selection step). As described above, the method for controlling the image forming apparatus 101 according to the third embodiment includes the determination step, the first normal discharge step, the first abnormal discharge step, the fourth abnormal discharge step, and the second selection step. Note that the second image forming job is executed after the image formation in the second selection step is terminated.

As described above, according to the image forming apparatus 101 of the present embodiment, in a case where an abnormal sheet is detected by the inspection apparatus 108, sheets from the abnormal sheet to a sheet that is one sheet before the same page number of sheet in a next copy as that of the abnormal sheet, among remaining sheets, are discharged to the escape tray 334. Therefore, the number of waste sheets can be reduced as compared with that in a case where all the remaining sheets are discharged to the escape tray 334. Moreover, since a dedicated conveyance path for temporarily retracting some of the remaining sheets is unnecessary, an increase in the number of components can be avoided. As a result, in the image forming apparatus 101 having a function of discharging a sheet determined to have an abnormal image by the inspection apparatus 108 to the escape tray 334, it is possible to suppress an increase in size and complexity of the apparatus while reducing the number of waste sheets.

Further, according to the image forming apparatus 101 of the present embodiment, the CPU 233 executes image formation until the number of copies of sheets discharged to the stack tray 331 reaches a set number of copies for the image forming job, and all of the set number of copies of sheets are discharged to the stack tray 331. Therefore, even though sheets from a sheet on which an abnormal image is formed to a sheet that is one sheet before the same page number of sheet in a next copy as that of the abnormal sheet are discharged to the escape tray 334, sheets can be compensated as many as the number of sheets discharged to the escape tray 334, thereby improving user's operability.

In addition, according to the image forming apparatus 101 of the present embodiment, a second image forming job may be consecutively executed after a first image forming job is terminated, with remaining sheets including a sheet on which an image is formed in the second image forming job. That is, if a sheet on which an abnormal image is formed is not a sheet included in a last copy of the first image forming job, sheets from the sheet on which the abnormal image is formed to a sheet that is one sheet before the same page number of sheet in a next copy as that of the abnormal sheet can be discharged to the escape tray 334, thereby reducing the number of waste sheets. On the other hand, if a sheet on which an abnormal image is formed is a sheet included in a last copy of the first image forming job, all the remaining sheets can be discharged to the escape tray 334.

Note that, in the image forming apparatus 101 of the present embodiment described above, during the processing of the printing apparatus 107, it is determined whether or not it is necessary to additionally print one copy by detecting whether or not the sheets have been discharged to the escape tray 334 after printing of all copies in the image forming job is terminated. However, the present invention is not limited thereto, and for example, during the processing of the inspection apparatus 108, processing of increasing the number X of copies of printing by one may be performed at the time when the sheets are discharged to the escape tray 334.

In addition, although it has been described that, as discharge places, two trays, i.e., the stack tray 331 and the escape tray 334, are applied to the image forming apparatus 101 of the present embodiment described above, the present invention is not limited thereto. For example, three or more discharge places including the second stack tray 341 or the like may be provided.

According to the present disclosure, by providing the function of discharging a sheet determined to have an abnormal image formed thereon by the inspection apparatus to the escape tray, it is possible to suppress an increase in size and complexity of the apparatus while reducing the number of waste sheets.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-124888, filed Jul. 30, 2021, which is hereby incorporated by reference herein in its entirety.

What is claimed is:

1. An image forming apparatus, comprising:
   a feeding roller configured to feed a sheet;
   an image former configured to form an image on the sheet fed by the feeding roller;
   a reading sensor configured to read the image formed on the sheet by the image former;
   a conveyance unit configured to convey the sheet on which the image has been read by the reading sensor;
   a first discharge tray and a second discharge tray to which the sheet conveyed by the conveyance unit is selectively discharged;
   a determination processor configured to execute determination processing to determine whether the image read by the reading sensor is a normal image or an abnormal image; and
   a controller,
   wherein if the determination processor determines that an image on a sheet is a normal image, the controller is configured to discharge the sheet on which the normal image is formed to the first discharge tray, and if the determination processor determines that an image on a sheet is an abnormal image, the controller is configured to discharge the sheet on which the abnormal image is formed to the second discharge tray,
   wherein in a first image forming job, images for a first copy and a second copy that is a next copy of the first copy are consecutively formed, each of the first copy and the second copy including a plurality of sheets,
   in a case where an (n)th sheet in the first copy is an abnormal sheet on which an abnormal image is formed, remaining sheets include sheets subsequent to the abnormal sheet, and the remaining sheets include a first group of remaining sheets and a second group of remaining sheets,
   the first group of the remaining sheets including sheets from an (n+1)th sheet to the last sheet of the first copy and sheets from a 1st sheet to an (n−1)th sheet of the second copy,
   the second group of the remaining sheets including sheets from the (n)th sheet of the second copy to the last sheet of the remaining sheets, and
   the controller is configured to execute an abnormal discharge mode in which the sheets of the first group of the remaining sheets are discharged to the second discharge tray and each of the sheets of the second group of the remaining sheets is discharged selectively to the first discharge tray or the second discharge tray based on a result of the determination processing, and
   wherein in the abnormal discharge mode,
   in a case where a second image forming job, in which an image formed by the image former is different from the image in the first image forming job, is consecutively executed after the first image forming job is terminated, and the second group of the remaining sheets includes a sheet on which the image is formed in the second image forming job, the controller is configured to discharge the sheet on which the image is formed in the second image forming job in the second group of the remaining sheets to the second discharge tray.

2. The image forming apparatus according to claim 1, wherein the controller is configured to execute image formation by the image former until a number of copies discharged to the first discharge tray reaches a set number of copies to be printed in the first image forming job.

3. The image forming apparatus according to claim 1, wherein in the abnormal discharge mode,
   in a case where a last copy of the first image forming job includes an abnormal sheet,
   the controller is configured to discharge all the remaining sheets to the second discharge tray.

4. The image forming apparatus according to claim 1, wherein in the abnormal discharge mode, the determination processor is configured not to execute the determination processing on the sheets of the first group of the remaining sheets.

* * * * *